United States Patent
Gorel et al.

(10) Patent No.: US 6,301,887 B1
(45) Date of Patent: Oct. 16, 2001

(54) LOW PRESSURE EGR SYSTEM FOR DIESEL ENGINES

(75) Inventors: Alexander Gorel, Hillsborough; John Lawrence Calabrese, Summit, both of NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/580,534

(22) Filed: May 26, 2000

(51) Int. Cl.[7] .................................................. F02B 33/44
(52) U.S. Cl. ........................... 60/605.2; 60/599; 60/309; 123/563; 123/585; 55/DIG. 30; 165/158
(58) Field of Search .................. 60/605.2, 599, 60/311, 297, 295, 309; 123/585, 568, 569, 570, 563; 55/DIG. 10, DIG. 30; 165/158

(56) References Cited

U.S. PATENT DOCUMENTS

| | | | |
|---|---|---|---|
| 4,264,346 | * 4/1981 | Mann | 55/DIG. 30 |
| 4,329,162 | 5/1982 | Pitcher, Jr. | 55/DIG. 30 |
| 4,702,079 | 10/1987 | Saito et al. | 60/599 |
| 4,813,632 | * 3/1989 | Woodhouse | 60/309 |
| 5,100,632 | 3/1992 | Dettling et al. | 60/311 |
| 5,423,180 | * 6/1995 | Nobue et al. | 60/274 |
| 5,440,880 | * 8/1995 | Ceynow et al. | 60/605.2 |
| 5,458,664 | * 10/1995 | Ishii et al. | 55/DIG. 30 |
| 5,486,220 | * 1/1996 | Honda et al. | 55/DIG. 30 |
| 5,551,971 | 9/1996 | Chadderton et al. | 95/15 |
| 5,766,458 | * 6/1998 | Sekhar et al. | 55/DIG. 30 |
| 5,771,868 | * 6/1998 | Khair | 60/605.2 |
| 5,915,472 | * 6/1999 | Takikawa et al. | 165/158 |
| 5,927,075 | 7/1999 | Khair | 60/605.2 |
| 5,947,063 | 9/1999 | Smith et al. | 123/3 |
| 6,003,316 | 12/1999 | Baert et al. | 60/605.2 |
| 6,062,026 | * 5/2000 | Woollenweber et al. | 60/605.2 |
| 6,145,498 | * 11/2000 | Packard et al. | 123/563 |

* cited by examiner

*Primary Examiner*—Thomas Denion
*Assistant Examiner*—Thai-Ba Trieu
(74) *Attorney, Agent, or Firm*—Richard A. Negin (57) ABSTRACT

A low pressure EGR system suitable for use as a passive retrofit system is disclosed for moving vehicles equipped with a diesel engine. The EGR loop inlet is positioned upstream of the exhaust particulate filter and downstream of the turbine to utilize backpressure created by the exhaust particulate filter to insure EGR flow in the loop. A catalyzed soot filter in communication with the EGR pickup insures cleansed EGR gases at the EGR return downstream of the air filter and upstream of the compressor. A corrugated EGR line provides cooling of the EGR gases.

17 Claims, 7 Drawing Sheets

LOW PRESSURE EGR SYSTEM FOR DIESEL ENGINES

This invention relates generally to an exhaust gas re-circulation (EGR) system for diesel engines and more particularly to a low pressure EGR system for diesel engines.

The invention is particularly applicable to and will be described with reference to a passive, low pressure EGR system particularly suited for retrofit applications to vehicles equipped with diesel engines lacking EGR systems. However, those skilled in the art will recognize that the invention has broader applications and may be integrated with the vehicle's ECU to meet current and proposed emission standards for OEM diesel powered vehicles or may be applied to stationary diesel engine applications such as that used in power generators.

INCORPORATION BY REFERENCE

The following United States patents are incorporated by reference herein and made a part hereof so that details relating to engine operation, EGR systems and system components need not be set forth in detail herein:

a) U.S. Pat. No. 5,927,075 to Khair, issued Jul. 27, 1999, entitled "Method and Apparatus for Exhaust Gas Recirculation Control and Power Augmentation in an Internal Combustion Engine";

b) U.S. Pat. No. 6,003,316 to Baert et al.,issued Dec. 21, 1999, entitled "Exhaust-Gas Recirculation System for a Turbocharged Internal Combustion Engine";

c) U.S. Pat. No. 5,947,063 to Smith et al., issued Sep. 7, 1999, entitled "Stoichiometric Synthesis, Exhaust, and Natural-gas Combustion Engine";

d) U.S. Pat. No. 4,702,079 to Saito et al., issued Oct. 27, 1987, entitled "Air-Cooled Type Intercooler for a Supercharged Internal Combustion Engine"; and, e) U.S. Pat. No. 5,100,632 to Dettling et al., issued Mar. 31, 1992, entitled "Catalyzed Diesel Exhaust Particulate Filter".

None of the patents incorporated by reference herein form any part of the present invention.

BACKGROUND

Current United States emission standards for heavy-duty vehicles powered by diesel engines require all new engines not to emit more than 4.0 g/bhp-hr (grams per brake horsepower—hour) of NOx (Nitrogen oxides). Engine manufacturers were able to meet this standard via various improvements to the engine design, advancement to the fuel injection equipment, sophisticated engine controls, etc. Tightening emission regulations by the United States Environmental Protection Agency (EPA) will soon require the heavy-duty diesels to produce 2.5 g/bhp-hr or less NOx and particulate matter emissions of 0.10 g/bhp-hr or less by the year 2002. Meeting this new standard will most likely require use of an EGR system.

For almost two decades, EGR systems have been known to reduce NOx emissions and, as now developed, have been successfully applied to modem gasoline engines to meet past and current emission regulations. Because of the tightening NOx standards for diesel engines, EGR systems have been and are currently being investigated for application to diesel engine emission systems for reduction of NOx. However, application of EGR systems to diesel engines present several distinct challenges or problems unique to diesel engines which include the following:

A) An insufficient differential pressure across the EGR line does not allow for a substantial flow rate of exhaust gases through the EGR line. Gasoline engines have a throttle in the air inlet that creates vacuum sufficient to drive a slipstream of exhaust gases through the EGR loop. Diesel engines, particularly heavy-duty diesel engines, do not have such a throttle.

B) The diesel engines can become contaminated with particulate matter present in the EGR gases, primarily soot. Diesel exhaust contains large amount of soot, which is generally not present in the exhaust gases of a gasoline engine.

C) Re-circulation of exhaust gas into the engine inlet increases emissions of unburned fuel components and particulate matter due to deterioration of the combustion process.

Figure 1:
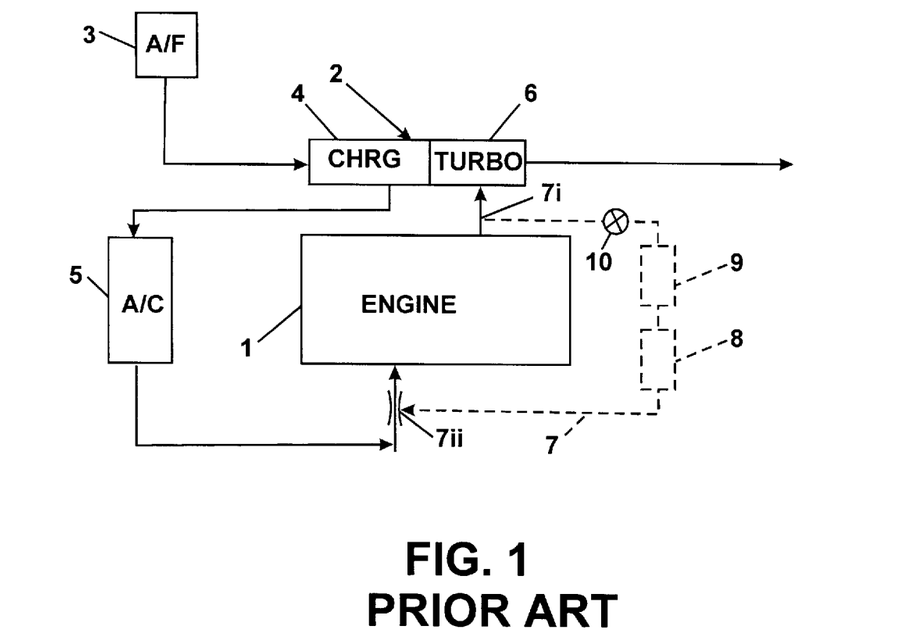
FIGS. 1 and 1A are prior art schematic representation of known EGR systems.
Figure 1A:
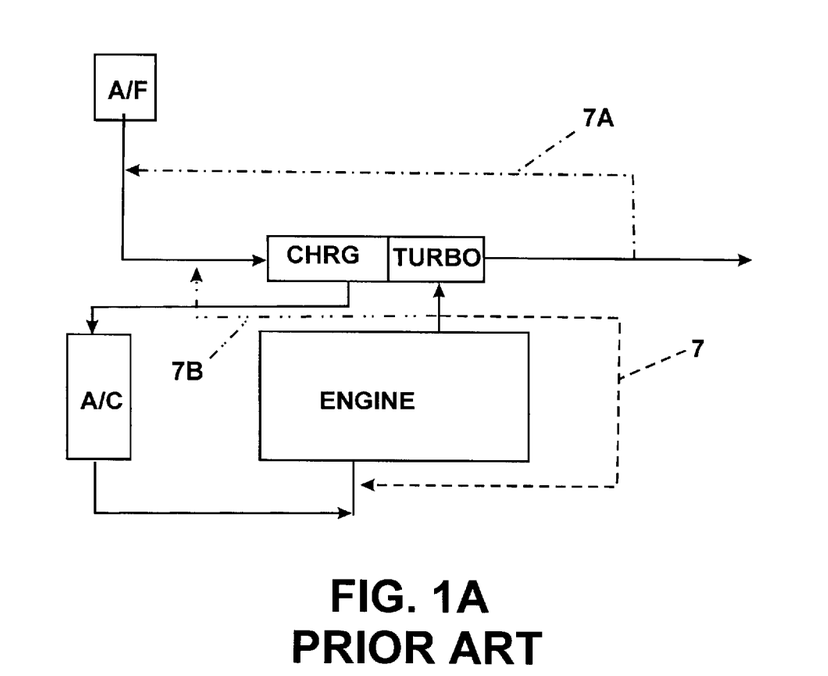

To overcome the insufficient differential pressure problem set forth in item (A), a so-called high pressure EGR (also known as "short-route") system has been developed. This system is schematically diagramed in prior art FIGS. 1 and 1A. FIG. 1 shows an engine 1 equipped with a turbocharger 2. Ambient air is drawn into the engine through an air filter 3 where it is compressed through a compressor or charger 4 of turbocharger 2 and subsequently cooled through an intercooler 5 before entering into engine 1. Exhaust gases from engine 1 pass through the turbine 6 (of turbocharger 2 which drives compressor 4) before passing through an exhaust system to atmosphere. A high pressure EGR loop, shown as dashed line 7, re-circulates a slip stream of exhaust gases between an inlet end 7i of EGR loop 7 that is upstream of turbine 6 and an exit end 7ii of EGR loop 7 that is downstream of boost air intercooler 5. A small differential pressure naturally exists between inlet and exit ends 7i, 7ii of the EGR loop. The differential pressure in EGR loop 7 is artificially enhanced by de-rating turbocharger 2. On a conventional turbocharger this is achieved through an appropriate internal geometry affecting exhaust and/or airflow conditions. On a modern variable geometry turbocharger (VGT) this is achieved through a control regulated by the engine control unit (ECU). An EGR valve 10 controls EGR flow and is typically vacuum or pressure operated, but can also be controlled through the engine's ECU. As described, the high pressure EGR system of FIG. 1 will provide sufficient differential pressure through EGR line 7 for exhaust gas flow although de-rating the turbo charger reduces its efficiency. Further, engine contamination is limited to internal components only. That is, because the EGR exit 7ii is downstream of the intercooler 5, contamination resulting from the exhaust gases in EGR loop 7 is not present in compressor 4 and intercooler 5.

However, a high pressure EGR system does not eliminate the contamination problem of items B and C above. In fact, engines equipped with a high-pressure EGR system suffer durability problems caused by the dirty exhaust in EGR line 7 being re-circulated into the engine. Further, the presence of the exhaust in the engine's combustion chamber and the artificially de-rated turbocharger reduce the engine's fuel efficiency.

In addition, there are more subtle problems caused by a high pressure EGR system, which have significant impact on the engine. By positioning the loop inlet (pick-up) 7i upstream of turbine 6, the temperature of the EGR gas is higher than what it might otherwise be, and because of the short travel distance to the intercooler and the engine combustion chamber a mixer, usually in the form of a venturi at loop outlet (return) 7ii is required. Because of high EGR temperature an additional cooler 8 in the EGR line 7 is required. Such an EGR cooler typically utilizes coolant liquid from the engine cooling system and imposes additional load on the system. Alternatively, if an EGR cooler is simply not applied the inlet gas temperature into the engine increases, causing an additional fuel penalty. Significantly, EGR cooler 8 has proven to be an expensive and non-durable component. It is typically a gas-to-water heat exchanger that plugs up quickly due to contamination with particulate matter. It is believed that contamination of the EGR cooler 8 is being addressed by others who are experimenting with inserting a catalyst or a soot filter 9 in EGR line 7. The belief is that a catalyst/soot filter will clean the EGR gas to avoid plugging or contamination of EGR cooler 8. However, the successful implementation of such system has not yet been demonstrated. The addition of a catalyst/soot filter into the high-pressure EGR loop will add additional restrictions to the flow of the EGR gas and may necessitate further de-rating of the turbo-charger causing an additional associated fuel penalty. It is to be recognized that in order to achieve maximum NOx removal effective cooling of the EGR gas is required. However, if the EGR gas is cooled below its dew point to achieve maximum NOx removal, moisture will condense in the EGR loop. This moisture reacts with nitrogen oxides and sulfates forming nitric and sulfuric acids which have a detrimental effect on the metal components of the engine when re-circulated back to the engine's combustion chamber (along with any condensed water which also has a detrimental effect on the engine and the combustion process). This problem is addressed in current EGR systems by maintaining the EGR gas temperature above its dew point. However, this corrective or avoidance action causes under-utilization of the NOx removal capabilities of the EGR system.

Finally, FIG. 1 illustrates that a substantial drawback of the high-pressure EGR system shown is the presence of a relatively complex control system. The basic control for the shown high-pressure EGR loop includes a vacuum or pressure operated EGR flow valve 10, and a more sophisticated system would also control turbocharger 2 through the engine's ECU. In order to assure proper air/gas mixing at the EGR loop outlet 7ii, a venturi or other mixing device is required. The overall complexity of the high-pressure EGR system makes it virtually impractical for retrofit applications. Most present day heavy-duty diesel powered vehicles are not equipped with EGR systems and their ECUs are not coded to control engines equipped with an EGR system. A need exists to equip such vehicles with a passive emission control system that will satisfy emission regulations without substantial modifications to the engine such as rebuilding or replacing the turbocharger, re-coding or replacing the ECU, etc.

An alternative to the high-pressure system is a low pressure EGR (also known as a "long route") system and this invention relates to such a system. A low pressure EGR system re-circulates exhaust gas between the two low pressure points of an engine. Specifically, the EGR line inlet (pick-up) is downstream of the turbine and the EGR line outlet (return) is upstream of the compressor and downstream of the air filter as shown by dot-dash line 7A in FIG. 1A. Until this invention, such a system has not been considered practical for diesel engines because of the following problems:

i) There is insufficient differential pressure to drive the exhaust gas stream through the EGR line, and ii) Engine contamination, which is more pronounced than that of the high-pressure loop, exists because the EGR gas travels through the compressor and air intercooler in the low-pressure EGR loop.

Specifically, the differential pressure between exhaust and intake of a low-pressure EGR loop is negligible at low and medium loads of the engine. Exhaust gas re-circulation occurs at high engine loads only. It is known, that throttling the tailpipe to create additional backpressure in the exhaust or throttling the intake airflow to create vacuum in the intake can artificially increase the EGR rate. However, such modifications produce limitations which adversely affect engine power output, fuel efficiency, durability and safety considerations that do not allow for a required EGR flow rate during high load engine operations. Generally, the principal reasons, until this invention, for low-pressure EGR systems not being accepted by the industry are:

a) Even small contamination with soot in the low-pressure system causes severe engine failure and cannot be tolerated, and b) High temperature at the inlet of the compressor is not acceptable.

There are, however, several attractive features of low-pressure EGR systems such as naturally lower EGR temperatures when compared to the high-pressure EGR system.

It should also be mentioned that a hybrid EGR, a combination of high and low-pressure EGR systems, also exists. Such a system would re-circulate exhaust between an EGR inlet upstream of the turbo and EGR outlet upstream of the compressor and downstream of the intake air filter as shown by the dot-dot-dash line 7B in FIG. 1A. The attractiveness of such a hybrid system resides in its ability to address the problem of insufficient differential pressures in the EGR loop, i.e., problem item A. That is, a hybrid high/low pressure EGR system will allow for relatively large EGR flow rates without artificially creating effects to induce differential pressures in the EGR line, such as de-rating the turbocharger. However, contamination problems B and C must be resolved as well as engine performance and durability, complexity of the design and the control(s) for such a system. To be accepted by the industry, such a system requires a particulate free EGR stream along with a very effective EGR cooler.

SUMMARY OF THE INVENTION

Accordingly, it is a principle object of this invention to provide an EGR system suitable for retrofit application to a variety of diesel engines, capable of effective reduction of NOx without increase in particulate matter and without contaminating the engine with particulate matter and corrosive acidic condense water, while producing minimal fuel penalty and power reduction.

This object along with other features of the present invention is achieved in an EGR system for a vehicle equipped with a diesel engine. The system includes a turbocharger having a compressor for supplying combustion air to the intake manifold and a turbine operatively connected to the compressor for receiving exhaust gases from the exhaust manifold to operate the compressor. An exhaust particulate filter, which controls tailpipe particulate emissions, is provided downstream of and in fluid communication with the outlet of the turbine for removing particulate matter from the exhaust gases and an intake air filter is provided upstream of the compressor for supplying filtered combustion air to the compressor. A low-pressure EGR line extends from an inlet downstream of the turbine and upstream of the main exhaust particulate filter to an outlet upstream of the compressor and downstream of the air filter. The EGR pick-up unit includes a small catalyst or a particulate filter to remove particulate from the EGR stream.

Positioning the EGR pick-up unit upstream of the main soot filter places the EGR inlet in the high exhaust pressure environment created by the main particulate filter. Additionally, a vacuum is created in the engine's air intake by the air filter. The high exhaust backpressure and vacuum in the air intake creates sufficient differential pressure across the EGR line to allow for substantial EGR rates. Significantly, differential pressure resulting from positioning the EGR line as stated affords sufficient quantities of re-circulated exhaust gas at operating engine speeds and loads whereat NOx is needed to satisfy emission regulations thus solving Background problem A and doing so without the need to artificially create enhanced pressure differentials which inevitably result in fuel penalties, engine power drains, etc.

In accordance with a particularly important aspect of the invention the EGR particulate filter has a catalyzed surface over which the exhaust gases entering the EGR line pass whereby the exhaust gases traveling through the EGR line are cleansed by the catalyzed surface. Preferably the EGR particulate filter is a gas pervious wall flow filter with the walls thereof coated with a catalyst whereby soluble organic fractions and insoluble fractions of particulate matter drawn into the EGR line are effectively removed from the exhaust gases thus solving Background problems B and C. The EGR particulate filter is sized to provide minimal restriction to the EGR flow. Significantly, the EGR particulate filter, by virtue of its size, prevents abnormally high EGR flow rates and protects the engine from failures attributed to excessive exhaust gases being introduced into the engine's combustion chambers. For example, should the main exhaust particulate filter plug up and increase backpressure, the smaller EGR particulate filter is unable to process excessively high flow rates and will likewise plug up well before the EGR flow rate reaches a dangerous level.

In accordance with yet another important feature of the invention, the EGR line is corrugated, sized and positioned in the vehicle for ambient air heat transfer contact with at least a portion of the EGR line when the vehicle is moving to reduce the temperature of the exhaust gases within the EGR line to a normal range. The normal return point temperature range, established by engine testing at full load operation, is approximately 200–250° C. so that external cooling of the exhaust gases within the EGR line is obviated. EGR gases at return point temperatures in the normal range, when mixed with intake air result in compressor inlet temperatures of approximately 48–55° C. representing very safe compressor operating temperature ranges. Significantly, by reducing the EGR return temperature, high compressor inlet temperatures (one of the reasons why, as explained in the Background, low pressure EGR systems have not heretofore been used) is eliminated and importantly, the system as defined thus far, can function as a passive EGR system readily adapted for retrofit applications to existing diesel powered vehicles not equipped with EGR systems. It is important to appreciate that such a "self-cooling" feature can be and should be combined with a conventional EGR cooler. Such a combination will result in better performance and a wider application range.

Still further the system is characterized by the absence of any special EGR gas-air mixing devices, such as a venturi used by the high-pressure EGR systems. Mixing devices are not required because the EGR exit is positioned in the engine's air induction path to provide a long travel which passes through the compressor and air intercooler prior to introduction in the engine's combustion chamber so that thorough mixing of the combustion air and EGR gases occurs.

In accordance with another important feature of the invention, the EGR system of the present invention further utilizes an intercooler downstream of the compressor to cool the air-EGR mixture below its dew point for better engine performance. Therefor, the invention provides that the intercooler is equipped with a reservoir for collecting condensed acidic water (resulting from the cooled air-EGR mixture) and a water level sensor for metering amounts of water collected in the reservoir to prevent condensed acidic water from entering the engine causing corrosion of metal surfaces, dilution of the lubricating oil, and additional restriction to the airflow through the intercooler. If not removed, condensation may also cause formation of ice in the wintertime plugging the intercooler. Accordingly, a specific feature of the invention to assure removal of the condensed water acid is the provision of a liquid level sensor and an electronically actuated solenoid drain valve with the reservoir. The drain valve operates to drain the reservoir when the reservoir is under positive pressure and in response to set liquid sensor readings to avoid inadvertent suction of the condense water into the engine should the engine operating condition be such that a vacuum is imposed on the intercooler.

In accordance with yet another feature of the invention, the inventive system may operate in an active control mode, just like any high-pressure EGR on modern, electronically controlled engines. In this case, an EGR flow valve and an intake/exhaust throttle are needed. An EGR cooler can also be used on an "as needed" basis.

It is thus a general object of the invention to provide a low pressure EGR system for a vehicle powered by a diesel engine, preferably heavy-duty diesel engines.

It is another object of the invention to provide a passive, low pressure EGR system for vehicles equipped with a diesel engine.

Yet another object of the invention is to provide a passive EGR system for retrofit applications to vehicles powered by a diesel engine, preferably heavy-duty engine applications.

Still another object of the invention is to provide a passive EGR system for heavy duty vehicles equipped with a diesel engine which satisfies near future EPA regulations limiting NOx emission to no more than 2.5 g/bhp-hr during a standard, heavy duty FTP test cycle.

Still another object of the invention is to provide an EGR system for diesel engines on moving vehicles that prevents acidic condensed water from entering the engine's combustion chambers.

An important object of the invention is to provide a low-pressure EGR system to a vehicle powered by a diesel engine in which the re-circulated exhaust gases are clean and free of soluble and insoluble particulate fractions.

Still another object of the invention is to provide a low-pressure EGR system for vehicles equipped with a diesel engine which has one or more or any combination of the following operating characteristics:

a) Sufficient differential pressure to drive the EGR loop without having to artificially change or modify the engine operation to induce differential pressure in the EGR line;

b) EGR gas cool-down using natural heat transfer through the walls of the EGR line without having to add a special cooler;

c) Clean EGR gases preventing contamination of engine and preventing the engine from producing increased emissions of unburned fuel components and particulate matter;

d) Low EGR and combustion air/EGR mixture temperatures to improve engine performance with minimal NOx formation;

e) Fail-safe EGR pick-up arrangement preventing excessive concentration of EGR gases entering the engine;

f) Excellent mixing of combustion air with EGR gases without the need for mixing devices;

g) Passive EGR application.

Yet another object of the invention is to provide an active, low pressure EGR system for diesel powered vehicles.

Still another object of the invention is to provide an inexpensive EGR system easily adaptable to a diesel engine.

These and other objects, features and advantages of the present invention will become apparent to those skilled in the art upon reading and understanding the Detailed Description of the Invention set forth below taken in conjunction with the drawings.

BRIEF DESCRIPTION OF THE DRAWINGS

The invention may take form in certain parts and in an arrangement of certain parts taken together and in conjunction with the drawings which form a part hereof and wherein.

DETAILED DESCRIPTION OF THE INVENTION

Figure 2:
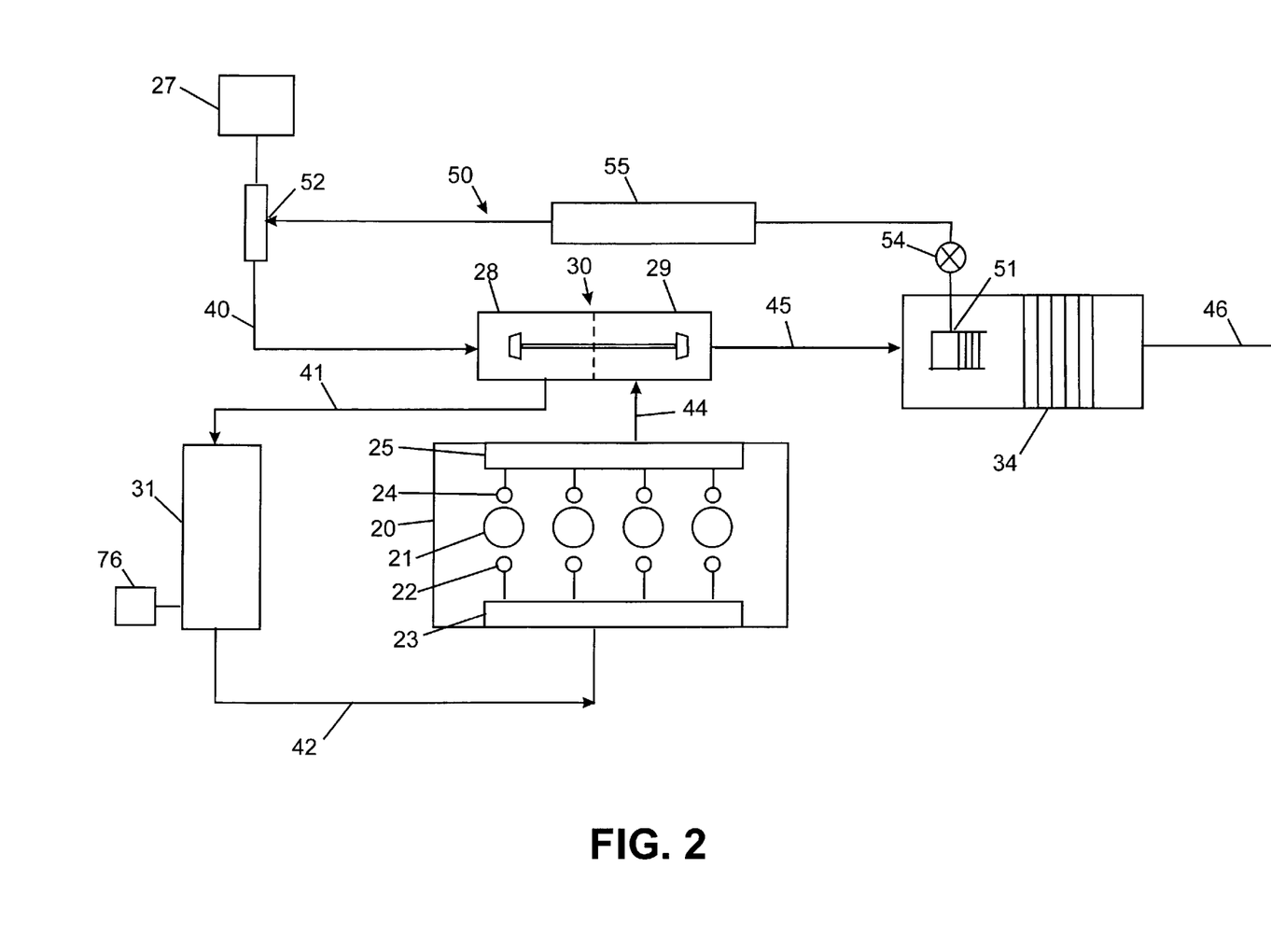
FIG. 2 is a schematic representation of the inventive low-pressure EGR system.

Referring now to the drawings wherein the showings are for illustrating preferred and alternative embodiments of the invention only and not for limiting same, there is shown in FIG. 2 a diesel engine 20 having a plurality of combustion chambers 21, each chamber having an intake valve 22 establishing timed fluid communication with an intake manifold 23 and an exhaust valve 24 establishing timed fluid communication with an exhaust manifold 25.

Combustion air is supplied to intake manifold 23 by ambient air drawn through an air filter 27. For consistent terminology, once ambient air is filtered and drawn into the system through air filter 27 it will be referred to as combustion air. Combustion air passes through a charger, supercharger or compressor 28 (hereinafter referred to as compressor) of a turbocharger 30 where it is compressed and in the process of compression becomes heated. Accordingly, the compressed, heated combustion air is cooled in an after-cooler or intercooler 31 (hereinafter termed intercooler) before passing to intake manifold 23.

Products of combustion produced in combustion chamber 21 hereinafter termed "exhaust gases" are exhausted to exhaust manifold 25 and pass through a turbine 29 in turbocharger 30 which operatively drives compressor 28 in a known manner. From turbine 29 the exhaust gases pass through an exhaust soot or particulate filter 34, hereinafter termed "exhaust particulate filter" before being exhausted to atmosphere. Exhaust particulate filter 34 removes soot and other solid particulate matter from the exhaust gases and may optionally be coated with an oxidation catalyst to oxidize unburned fuel components such as hydrocarbons (HC) and CO. An example of an exhaust particulate filter is set forth in assignee's U.S. Pat. No. 5,551,971 to Chadderton et al. issued Sep. 2, 1996 and patents cited therein and U.S. Pat. No. 5,100,632 to Dettling et al. issued Mar. 31, 1992 and patents cited therein, all incorporated by reference herein and made a part hereof. Reference should be had to the '971 and '632 patents and the patents cited therein for a more detailed description of exhaust particulate filter 34. As described thus far, the system is entirely conventional.

It is to be appreciated that the flow of combustion air and exhaust gases and the temperature thereof is a function of the speed and load of engine 20. Because the inventive low pressure EGR system must function in this environment, it may be helpful in understanding the present invention to list in a general sense temperatures and pressures of the combustion air and exhaust gases in the system as described for "low", "medium" and "high" engine speeds measured during full load operation. Specifically, air inlet duct 40 between air filter 27 and compressor 28; compressor duct 41 between compressor 28 and intercooler 31; intercooler duct 42 between intercooler 31 and intake manifold 23; engine exhaust duct 44 between exhaust manifold 25 and turbine 29; turbine exhaust duct 45 between turbine 29 and particulate filter 34, and tailpipe 46 define generally system locations where conceivably EGR loops can be positioned. Generally, temperatures and pressures of combustion air or exhaust gases at the specified ducts for various engine operating conditions have been recorded as set forth below in tabular form for a M-11 Cummins truck engine tested at ambient air temperatures of 25–35° C. under full torque conditions

| Duct Location | Low Speed (1000 rpm) | Medium Speed (1200 rpm) | High speed (1800 rpm) |
| --- | --- | --- | --- |
| Air inlet 40 (air/EGR mixture) | T = 53° C. P = −0.2" Hg | T = 57° C. P = −0.4" Hg | T = 48° C. P = −1.1" Hg |
| Compressor 41 | T = 145° C. P = 27.8" Hg | T = 172° C. P = 39.5" Hg | T = 183° C. P = 49.1" Hg |
| Intercooler 42 | T = 42° C. P = 27" Hg | T = 49° C. P = 38.3" Hg | T = 59° C. P = 46.9" Hg |
| Engine 44 | T = 661° C. P = 11.5" Hg | T = 666° C. P = 18.9" Hg | T = 581° C. P = 34.9" Hg |
| Turbine 45 | T = 587° C. P = 1.7" Hg | T = 564° C. P = 2.5" Hg | T = 456° C. P = 4.1" Hg |
| Tailpipe 46 | T = 542° C. P = 0.1" Hg | T = 519° C. P = 0.1" Hg | T = 430° C. P = 0.1" Hg |

The inventive system incorporates a low-pressure EGR line 50 with an inlet (pick-up) 51 located in the exhaust duct 45 downstream of turbine 29 and upstream of exhaust particulate filter 34 and an outlet (return) 52 in air inlet duct 40 downstream of air filter 27 and upstream of compressor 28. Optionally included in EGR line 50 is an EGR flow control valve 54 and an EGR cooler 55. From the tabulated data it can be seen that differential pressure across EGR line 50 between inlet 51 and 52 of about 1.9" Hg at low engine speed, 2.9" Hg at medium engine speed, and 5.2" Hg at high engine speed exists. The differential pressure at the positions stated are sufficient to generate EGR flow rates of about 12.2–13.8% of total exhaust mass flow at an engine speed range of 1000–1800 rpm under full load. The quantity of EGR gas delivered to combustion chamber(s) 21, especially when the inventive system cleanses and reduces the EGR gas temperature as described further below, is sufficient to demonstrate a 35% reduction of NOx emissions from engine 20 over the standard FTP test cycle.

Figure 3:
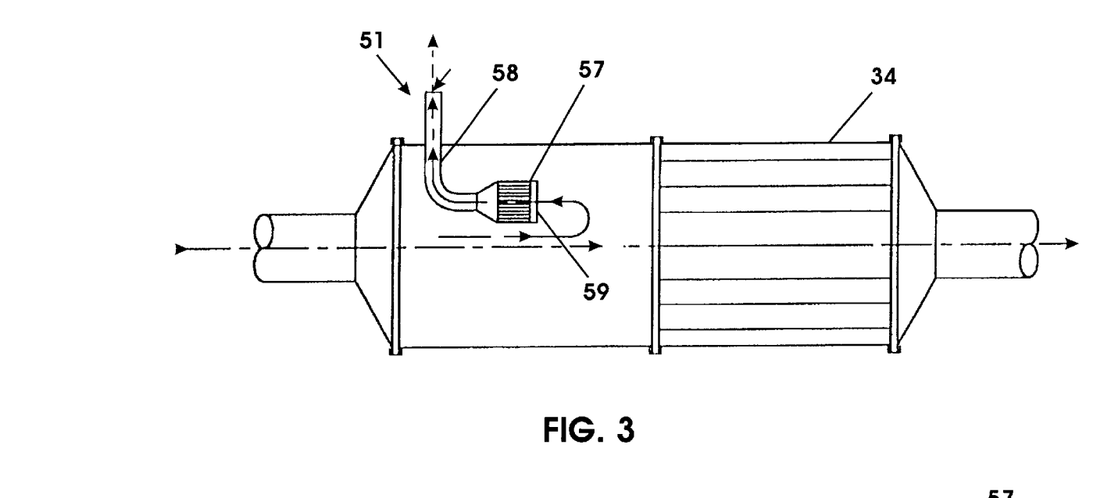
FIG. 3 is a schematic representation of the EGR pick-up tube, EGR particulate and exhaust particulate filters used in the inventive EGR system.

Referring now to FIG. 3, there is shown a modification to the housing of exhaust particulate filter 34 to accommodate an EGR particulate filter 57 having an outlet in fluid communication with a pick-up tube 58 at EGR inlet 51. Note that the inlet 59 of EGR particulate filter 57 faces the inlet of exhaust particulate filter 34 causing the exhaust gas to loop back as shown in FIG. 3 because of backpressure produced by exhaust particulate filter 34. This orientation is preferred because it tends to impart a quiescent flow of the exhaust gases into the EGR filter inlet 59. However, EGR particulate filter 57 will function if filter inlet 59 opens to receive the oncoming exhaust gases. It is to be appreciated that because EGR inlet 51 is upstream of exhaust gas particulate filter 34, the exhaust gases have essentially the same composition as they had when exiting combustion chambers 21.

As is well known, exhaust gases from diesel engines include gaseous pollutants such as hydrocarbons (HC), nitrogen oxides (NOx), carbon monoxide (CO), as well as particulate matter, which comprise both a dry, solid carbonaceous fraction and a soluble organic fraction ("SOF"). The SOF comprise both high molecular weight HC typically greater than $C_9$ and usually ranging from $C_{12}$ to $C_{50}$ resulting from unburned and partially burned diesel fuel and lubricating oil. The SOF is present in the diesel exhaust as either a vapor phase or a liquid phase, or both, depending on the temperature of the exhaust and can also be adsorbed onto the solid carbonaceous fraction. Additionally, the exhaust contains other particles, such as zinc and phosphate (resulting from lubricating oils), calcium, magnesium and silicates (resulting from engine coolant) and iron (resulting from engine wear). Combined together they form exhaust ash. As used herein, "particulate" means complete particulate matter including all solid particles and SOF emitted from the engine in its exhaust gas. Because EGR low pressure line 50 introduces the EGR gas upstream of compressor 28 it is imperative that the EGR gas be cleansed of any particulate which could adversely impact the operation of or shorten the life of compressor 28.

Figure 4:
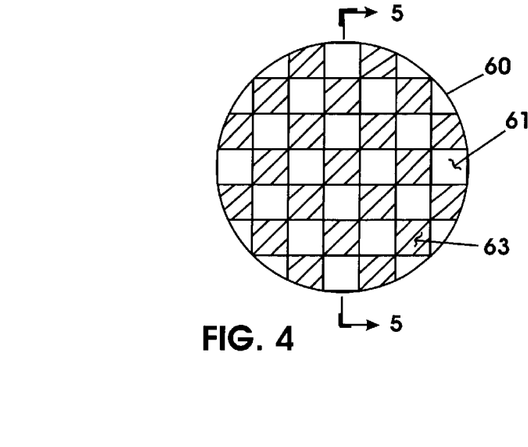
FIG. 4 is a schematic end view of a wall flow EGR catalyst used in the filter schematic of FIG. 3.
Figure 5:
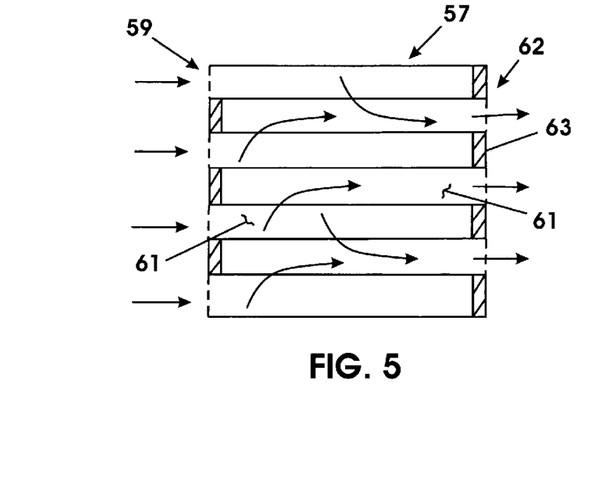
FIG. 5 is a longitudinal sectioned schematic view of the wall flow EGR filter shown in FIG. 4 taken generally along lines 5—5 thereof.

Accordingly, in the preferred embodiment of the invention a wall-flow filter as schematically illustrated in FIGS. 4 and 5 is used as EGR particulate filter 57. The wall-flow filter includes an outer wall or casing 60 interconnected by a large number of interlaced, thin porous internal walls, which define a honeycomb structure made up of a large number of channels 61 longitudinally extending from the inlet 59 to the outlet end 62 of the filter. Alternating ends of adjacent channels are plugged as indicated by reference numeral 63 resulting in a checkerboard pattern at the inlet (as shown in FIG. 4) and outlet ends of the filter. Channels which are open at the upstream or inlet end of the filter are plugged at the downstream or exit end of the filter while channels which are plugged at the filter inlet end are open at the filter exit end. This construction forces the exhaust gases to enter the open inlet channels and flow through the porous walls into an adjacent channel having an open exit end i.e., an exit channel, through which the gases exit the filter into pick-up tube 58.

Typically the porous walls of EGR particulate filter 57 are fabricated from ceramics but can generally include crystalline, glass ceramics, glasses, metals, cements, resins or organic polymers, papers, textile fabrics (with or without filters) and combinations thereof. A detailed description of various filters may be found in U.S. Pat. No. 4,329,162, the disclosure of which is hereby incorporated by reference herein.

The porosity and sizing of EGR particulate filter 57 is important to the ability of the inventive low-pressure EGR system to re-circulate EGR gases without having to add artificially induced pressure enhancements to EGR line 50. Typically, a clean exhaust particulate filter 34 in the exhaust system will create a backpressure of up to 3.0" Hg (This may slightly vary depending on engine manufacturer's specification for the exhaust backpressure). The EGR particulate filter 57 is designed to provide minimal restriction to the EGR flow of about 0.1–0.3" Hg which does not adversely affect the pressure differential in EGR line 50. In the preferred embodiment, the substrate material (filter media) of EGR filter 57 is essentially the same as exhaust particulate filter 34. Generally speaking, for exhaust and EGR filters 34, 57 using the same or similar wall-flow construction geometry, EGR filter 57 is sized as a percentage of exhaust filter 57 approximately about and preferably slightly in excess of the EGR exhaust mass flow rate. From the tabulated data, differential pressures in EGR line 50 (1.9", 2.9" and 5.2" Hg at different engine speeds) resulted in EGR gas mass flow rates of 12–13% of the total exhaust mass flow rate through EGR line 50. EGR filter 57 is therefore sized anywhere between about 10–15% of the size of exhaust particulate filter 34 i.e., +/-2%. Preferably, EGR filter 57 could be sized to be about 15% of the size of exhaust particulate filter 57 which is slightly in excess of the EGR exhaust flow percentage of total exhaust mass flow so that EGR filter does not act to limit the flow of EGR exhaust gas in EGR line 50 while not materially increasing overall exhaust gas backpressure. In the embodiment from which test data noted herein was extracted, exhaust particulate filter 34 (11.25" diameter with a length of 14") had a filter volume (total volume of channels 61) of 1392 $in^3$. EGR particulate filter 57 had a filter volume of 151 $in^3$ which is about 11% of the volume of exhaust particulate filter 57. Note that under fall load and speed whereat exhaust particulate filter 57 may produce 3" Hg backpressure, EGR filter 57 is adding approximately 0.3" Hg to the exhaust gas backpressure. Those skilled in the art will readily recognize that the preceding discussion applies to similarly constructed exhaust and EGR filters 34, 57 and it is possible to change the filter geometry of the EGR filter or the permeability of the wall-flow channels to arrive at entirely different sizing ratios which nevertheless size EGR filter 57 such that EGR filter 57 can process desired volumes of EGR exhaust gases without significantly increasing backpressure exerted on the exhaust gases leaving engine 20. All such known sizing techniques or methods may be used in this invention.

Clearly, EGR filter 57 is much smaller in size than exhaust particulate filter 34 because it is sized for relatively low EGR flow rates. Therefore, should exhaust particulate filter 34 clog in service due to the lock of regeneration or engine malfunctioning, the whole exhaust flow will be diverted naturally to EGR filter 57, which is not capable of handling such a big flow. Therefor, EGR filter 57 will plug-up very quickly preventing excessively high EGR rates. This is an important distinct feature of the inventive low-pressure EGR system.

It must also be noted, that while the primary purpose of EGR particulate filter 57 is to filter particulate from the exhaust gases, EGR filter 57 also has catalyzed walls to enhance oxidation of particles deposited on the walls, and to oxidize unburned fuel components, such as HC, CO, and SOF, thereby preventing re-circulation of unburned pollutants back to the engine. The catalyst material is not a subject of this invention, but it is essentially the same as for exhaust particulate filter 34. For example, in the preferred embodiment, a Pt catalyst present in a coating weight or concentration of about 5 grams per cubic foot ($g/ft^3$) of filter volume was used. It could also be different depending on special considerations, such as the necessity to regenerate the filter at certain temperatures. Both catalysts for EGR particulate filter 57 and exhaust particulate filter 34 may vary depending on a specific engine exhaust composition, fuel quality, sulfur content, service duty cycle, etc. Generally speaking, any particulate filter can be used in the low-pressure EGR, as long as it removes exhaust particulate matter from the EGR loop. It is believed that the chemical composition of the EGR filter does not affect the efficiency of NOx reduction, but greatly improves durability and longevity of an engine equipped with EGR system.

Figures 6, 7:
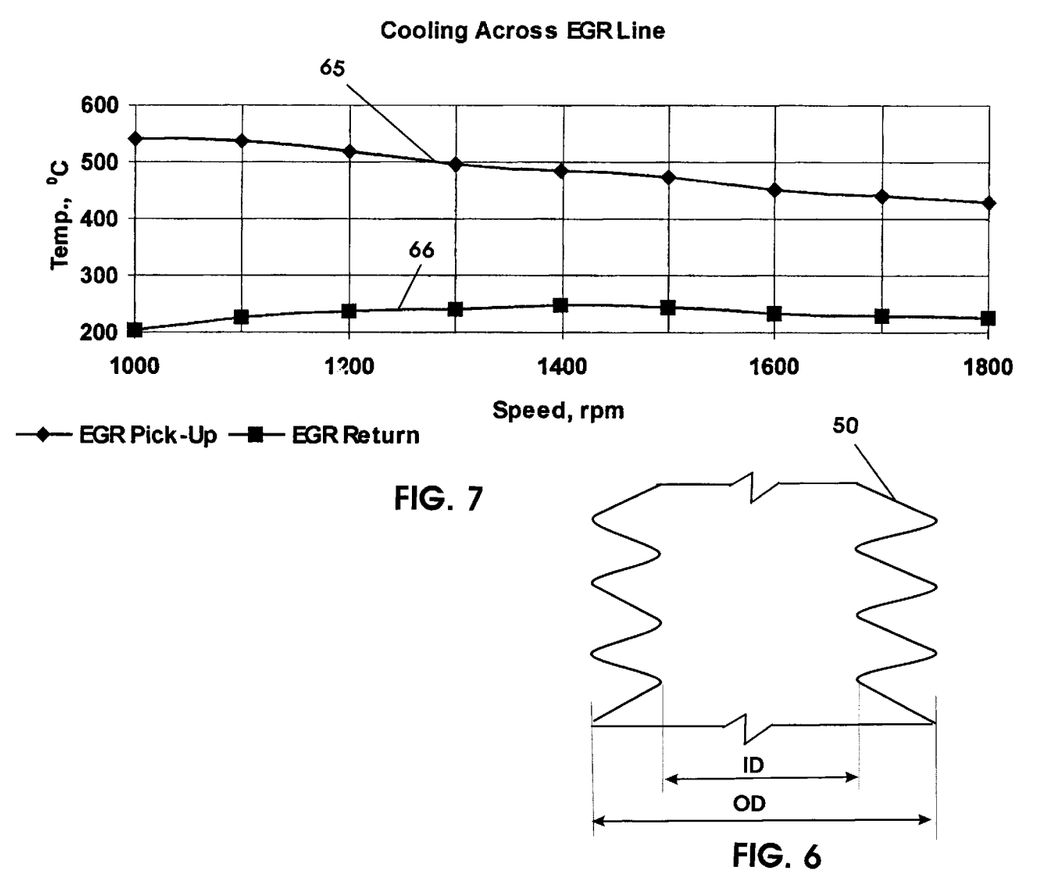
FIG. 6 is a longitudinally sectioned view of a portion of the EGR corrugated line.
FIG. 7 is a graph of EOR inlet (pick-up) and outlet (return) gas temperature for various engine loads.

In the preferred embodiment, EGR line 50 is corrugated or it is corrugated over at least a portion of its length as shown in FIG. 6. EGR line 50 is plumbed so that at least its corrugated portions are exposed to atmospheric airflow thereabout when the vehicle is moving. As shown in FIG. 6, the corrugations are pronounced and extend between an inside diameter of EGR line 50 and an outside diameter of EGR line 50. In effect the corrugations act as fins such as the fins in a radiator which extend between tubes carrying engine coolant, except that the EGR gases actually travel within the fins i.e., corrugations. The EGR line 50 is sized as a function of the desired air/gas mixture temperature at the compressor inlet as set forth in the table above. This temperature is controlled via heat transfer process from the EGR gas through the corrugated EGR line into the ambient air. Factors entering into the heat transfer equations include the flow rate of the EGR gases within EGR line 50, the ID and OD of the line, line thickness, number of corrugations per linear feet of EGR line and line length. Reference can be made to FIG. 7, which is a plot of EGR gas temperature at EGR line inlet 51 shown as the trace passing through diamonds designated by reference numeral 65 and EGR gas temperature at EGR line outlet 52 shown as the trace passing through squares designated by reference numeral 66 for various engine speeds or loads. FIG. 7 shows that even with increasing engine speeds, the outlet temperature of EGR gases remained fairly consistently around 200° C. EGR line 50 used for the data depicted in FIG. 7 had an ID of 1.55", OD of 2.09", gauge thickness of 0.15", overall length of 12 feet, and 41 corrugations per linear foot. It should be noted that the presence of corrugations allows bending of EGR line 50 for relatively easy retrofit applications. Alternatively, EGR line 50 can be a conventional cylindrical tube with sections having thin, annular fins radially extending beyond the tube and longitudinally spaced from one another that are inserted into the tube to provide desired cooling.

Figure 8:
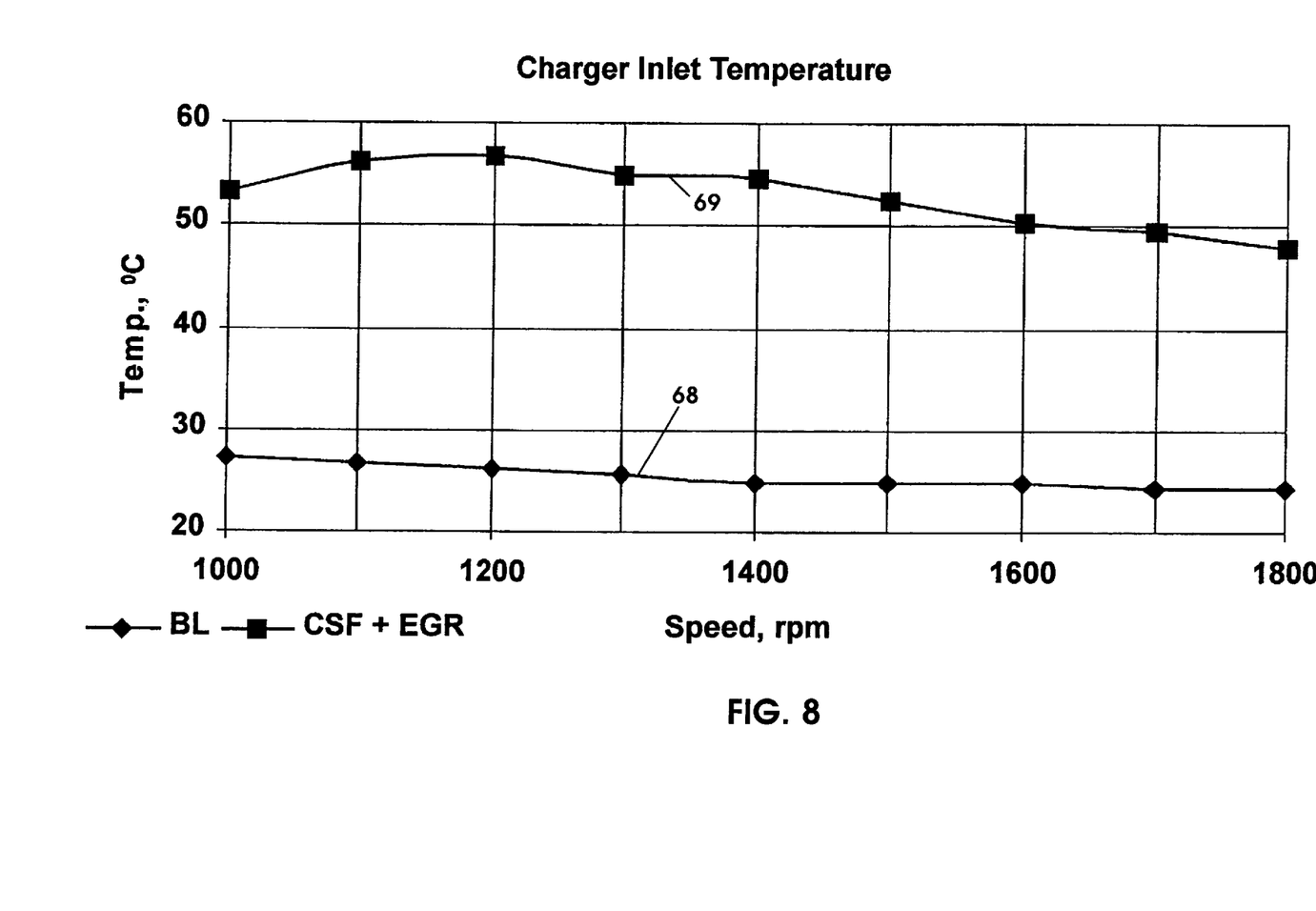
FIG. 8 is a graph of gas temperature at the inlet of the compressor for various engine loads showing gas temperature with and without the EGR system of the present invention.

The graph depicted in FIG. 7 should be referenced to the graph depicted in FIG. 8. As noted with reference to FIG. 2, EGR line outlet 52 (also known as and hereafter referred to as EGR return 52) mixes the cleansed EGR gas with filtered combustion air at air inlet duct 40, and the cleansed EGR gas with combustion air is introduced to the inlet of compressor 28.

When the inventive EGR system is used as a passive EGR system, EGR return 52 is designed as a unit that simply ensures a leakage-free durable mechanical connection to the engine intake system. It could be made as a single piece, welded tube or an assembly unit, however, this unit does not require any features to enhance air/EGR mixing such as a venturi used in a high pressure EGR system as previously mentioned. When the inventive low pressure EGR system is used as an active system, EGR return 52 could additionally incorporate an intake air throttle to control the EGR gas flow rate. The throttle, per se, would not be used to enhance air/EGR mixing.

Figure 11:
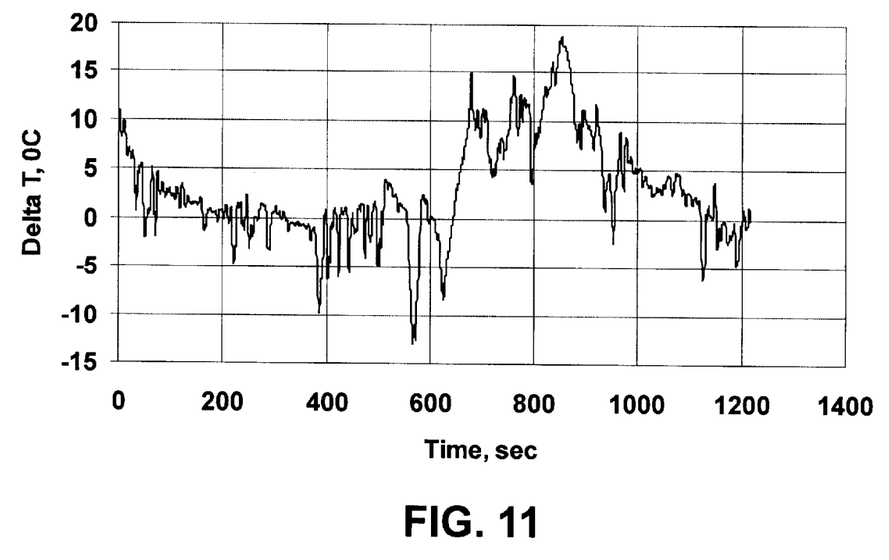

FIG. 8 plots combustion air temperature without any EGR gas entering the inlet of compressor 28 for various engine speeds as the trace passing through diamonds indicated by reference numeral 68. FIG. 8 also plots combustion air mixed with EGR cleansed gas entering the inlet of compressor 28 for various engine speeds as the trace passing through squares indicated by reference numeral 69. Trace 69 shows that the temperature of the gases at the inlet of compressor 28 is not significantly increased when the EGR gases, cooled as described with reference to FIGS. 6 and 7 is introduced into the combustion air. This is consistent with what should be expected from a study of FIG. 7, which shows that the EGR gases are fairly consistently cooled to the temperature of 200° C. Since the EGR gas temperature is fairly constant and the combustion air temperature at ambient is fairly constant, one would expect that trace 69 would develop. It is not surprising that the introduction of EGR cleansed gas at about 200° C. with combustion air at ambient temperature produces a gas mixture temperature of 50–55° C. This is due to the fact that the airflow at shown conditions is about 8 to 9 times higher than the EGR flow. When the engine is not under fall load, the airflow is significantly higher than 9 times the EGR flow. These temperatures at the compressor inlet are well within safe operating range of the compressor 28 and because the EGR gases are cleansed through EGR particulate filter 57, there is no detrimental effect on compressor 28 attributed to the EGR gases. The graphs plotted in FIGS. 7 and 8 are steady state plots. In an FTP cycle, the engine is subjected to varying loads and speeds producing transient conditions. Reference can be made to FIG. 11 which is a plot showing temperature change of the exhaust gases at EGR inlet (EGR pick-up) 51 during a heavy duty engine FTP test cycle. FIG. 1 shows that transient temperature change of the exhaust gases occurring during the cycle are not of a magnitude which would cause high temperature "spikes" adversely impacting the operation of compressor 28.

As described thus far, the inventive system is ideally suited for retrofit application as a passive EGR system to vehicles powered by diesel engines, particularly heavy and medium duty vehicles. (As used herein and in the claims, "vehicles" includes buses, trucks, cars, mobile and stationary power generators, marine vessels, ships, boats, dirigibles, balloons etc.) It is fully applicable to a variety of light-duty vehicles as well, such as small delivery trucks, passenger cars, etc. Since most light-duty engines operate in a relatively low exhaust temperature range, the proposed low-pressure EGR system may require special features to ensure regeneration of the particulate filters, i.e., external heat for burn-off or specially formulated catalysts as described in U.S. Pat. No. 5,100,632. However, the efficiency of NOx removal is expected to be generally the same for all of the above applications.

Figure 10:
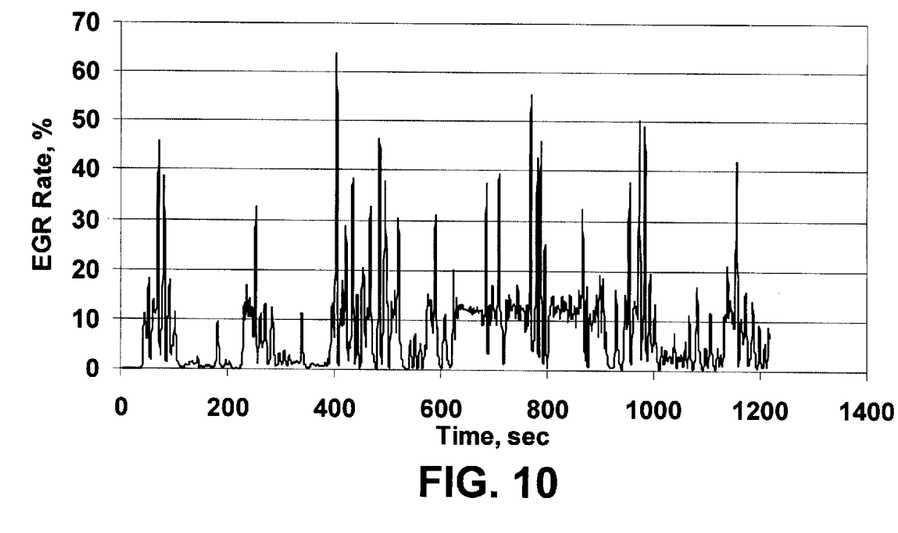
FIG. 10 is a graph of the EGR gas flow rate of the inventive low pressure EGR system recorded during an FTP test cycle; and, FIG. 11 is a graph of the change in EGR pick-up gas temperatures recorded during an FTP test cycle.

When a diesel engine is operating at idle or low speeds and loads very little natural differential pressure results in EGR line 50. As the engine's speed increases, pressure differential in EGR line increases and flow of EGR gases in EGR line 50 increases. It is well known, however, that diesel engines produce little nitrogen oxides at idle and low speeds, especially at low loads. Production of nitrogen oxides increases with an increase in speed and/or load. Thus the present invention when used as a passive system increases EGR gas flow when the EGR gases are needed the most to limit production of nitrogen oxides. Reference can be had to FIG. 10 which is a plot of measured EGR mass flow rates expressed as a percentage of total exhaust mass flow rates recorded during a heavy duty vehicle FTP (federal test procedure) tests. FIG. 10 shows little EGR flow, which occurs at low load and speed portions of the cycle with high flow transients occurring during load/speed changes. The transient EGR flows plotted in FIG. 10 should be compared to the steady state tabulated data taken under full torque conditions. A heavy-duty FTP test conducted on a Cummins M-11 truck engine without EGR system showed 3.57 g/bhp-hr NOx emissions. When the engine was equipped with the inventive system as a passive EGR system, emissions of NOx were reduced to 2.3 g/bhp-hr over the same FTP test.

Figure 9:
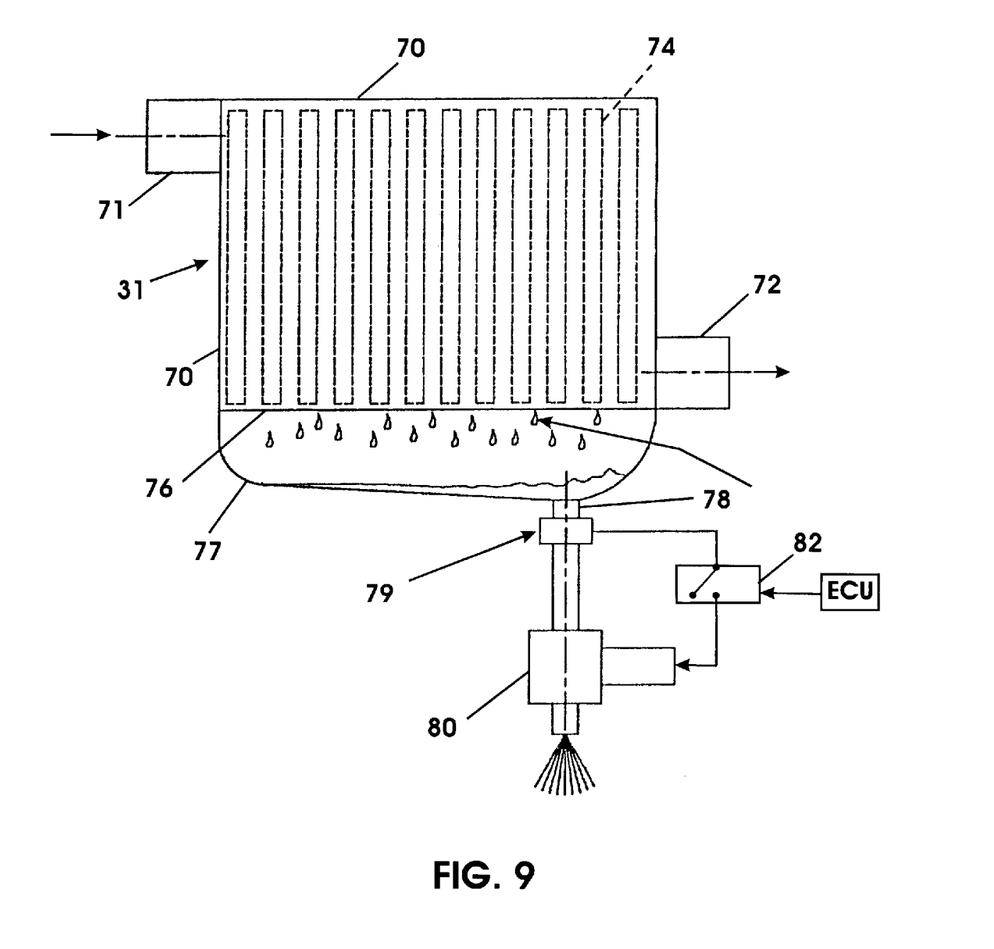
FIG. 9 is a schematic representation of a modified intercooler used in the present invention.

Further improvements in reduction of NOx are possible if intercooler 31 is modified as shown in FIG. 9. As discussed in the Background, full benefits of an EGR system for reducing NOx are realized if the EGR gas is cool when introduced into the combustion chamber and the efficiency of the engine is improved if the combustion air is introduced in a cooled state, i.e., the reason for intercooler 31. It is well known that exhaust gases produced by a diesel engine contain water vapor, i.e., water vapor may, for example, comprise 0.5 to 4% by volume of diesel engine exhaust gases. If the EGR gases are cooled, the water vapor will condense or precipitate as water. Similarly, if the combustion air is cooled below its dew point, moisture will condense. Injection of water into the combustion chamber is not desirable. Perhaps, more significantly, the condensed water reacts with any sulfur oxides and nitrogen oxides in the EGR gases to produce sulfuric and nitric acids according to the following equations:

In accordance with this invention, intercooler 31 can be designed and operated to cool the cleansed EGR gases and combustion air to temperatures whereat condensation is formed but without suffering any of the adverse effects attributed to the presence of acidic condensed water.

Referring now to FIG. 9, a conventional intercooler 31 which is typically an air-to-air heat exchanger is essentially a sealed rectangular box as shown by reference numeral 70 fitted with an inlet 71 and an outlet 72. At inlet 71 hot combustion air and cleansed EGR gases resulting from compressor 28 are introduced and cooled combustion air and cleansed EGR gases exit inlet 71. Within rectangular box 70 are sealed tubes 74 through which outside air flows and the combustion air and cleansed EGR gases must flow around the tubes 74 and in heat transfer contact therewith to reach outlet 72. Alternatively tubes 74 could have a liquid coolant circulating therethrough. This invention opens the bottom wall 76 of rectangular box 70 and fits a reservoir 77 to the bottom of rectangular box 70 for collecting acidic condensed water. Thus if condensed water is formed it will flow to reservoir 77 and not to outlet 72. On a reservoir drain 78 a water sensor 79 is present and signals a solenoid-operated drain valve 80 to open or close the drain. However, interlock 82 is provided with the water sensor signal, which prevents actuation of drain valve 80 unless a positive pressure is sensed in reservoir 77. It is potentially possible for the engine to temporarily operate at conditions which can cause vacuum in reservoir 77 such that opening drain valve 80 could conceivably cause the condensed water to be drawn out outlet 72. For example, hard engine acceleration accompanied by a turbocharger lag can produce vacuum in reservoir 77. The engine conditions causing the vacuum can be sensed by sensors already on the engine to provide the signal to interlock 82, i.e., through the vehicle's ECU. Alternatively, reservoir 77 can be fitted with a pressure sensor (not shown) to provide the interlock signal.

The invention has been described thus far as a passive system functioning without any need for artificially creating any differential pressure in the EGR loop. For definitional purposes, a "passive system" when used with respect to an EGR system means the EGR system functions without any external control. In contrast, an "active system" means the EGR system functions by means of an external control. When the inventive system is used as an active system, EGR flow valve 54 is inserted into EGR line 50 to control the EGR gas flow through EGR line 50. EGR flow valve 54 can be a pressure or vacuum or solenoid operated valve under control of the engine's ECU (not shown). EGR flow valve 54 is typically an on-off valve such that when the valve is "on", the system functions as the passive system described above. An optional EGR cooler, air-to-air or air-to-liquid type, 55 as shown in FIG. 2 may also be included to insure cooling if EGR flow rates materially increase over that set forth in the passive application discussed above. Further, in the active system application of the invention, artificially created differential pressure techniques assuring set flows of EGR at all operating engine conditions may be employed. This can take the form of a suction fan on EGR line 50 as well as other means to enhance pressure differentials such as a baffle in tailpipe 46 or a throttle in air intake line 40 or the EGR return 52 discussed above.

The invention has been described with reference to preferred and alternative embodiments. Obviously, modifications and alterations will occur to those skilled in the art upon reading and understanding the Detailed Description of the Invention. It is intended to include all such modifications and alterations insofar as they come within the scope of the present invention.

Having thus defined the invention, it is claimed:

1. An EGR system for a vehicle equipped with a diesel engine having an intake manifold and an exhaust manifold comprising:

a turbocharger having a compressor for supplying combustion air to said intake manifold and a turbine operatively connected to said compressor for receiving exhaust gases from said exhaust manifold to operate said compressor;

an exhaust particulate filter downstream of and in fluid communication with the outlet of said turbine for removing particulate matter from the exhaust gases;

an EGR particulate filter positioned upstream of said exhaust particulate filter and downstream of said exhaust manifold;

an intake air filter upstream of the compressor for supplying filtered combustion air to said compressor;

a low pressure EGR line extending from an inlet downstream of said turbine to an outlet upstream of the compressor and downstream of the air filter;

said inlet of said EGR line formed as a pick-up tube containing said EGR particulate filter whereby backpressure developed on the exhaust gases by the exhaust particulate filter in combination with vacuum developed at said EGR line outlet by filtered combustion airflow from the air filter induces a slip stream of the exhaust gases to travel through said EGR line from its inlet to its outlet.

2. The EGR system of claim 1 wherein the EGR particulate filter has a catalyzed surface over which the exhaust gases entering the EGR line pass whereby the exhaust gases traveling through the EGR line are cleansed by the catalyzed surface.

3. The EGR system of claim 2 wherein the EGR particulate filter is a gas pervious wall flow filter with the walls thereof coated with a catalyst whereby soluble organic fractions and insoluble fractions of particulate matter drawn into the EGR line are effectively removed from the exhaust gases, said EGR particulate filter sized smaller than said exhaust particulate filter to assure clogging thereof should said exhaust particulate filter fail from being clogged with particulates.

4. The EGR system of claim 3 further including an intercooler downstream of the compressor for cooling compressed combustion air and re-circulated exhaust gases to temperatures equal to or below the dew point of at least one of the combustion air and re-circulated exhaust gases, the intercooler having a reservoir for collecting condensation and a valve for removing collected condensation from the reservoir whereby injection of liquid in the form of water, nitric and sulfuric acids formed by reaction of condensed water with the exhaust gases into the combustion chamber of the engine is avoided.

5. The EGR system of claim 3 wherein the EGR line is corrugated, sized, and positioned in the vehicle for ambient air heat transfer contact with at least a portion of the EGR line when the vehicle is moving to reduce temperature of the exhaust gases within the EGR line to a normal level of no more than about 250° C. whereby external cooling of the exhaust gases within the EGR line is obviated.

6. The EGR system of claim 1 wherein at least a portion of said EGR line is corrugated, sized, and positioned in the vehicle as a single exposed line for ambient air heat transfer contact when the vehicle is moving to reduce temperature of the exhaust gases within the EGR line to a normal level of no more than about 250° C. whereby external cooling of the exhaust gases within said EGR line is obviated.

7. The EGR system of claim 1 further including an intercooler downstream of the compressor for cooling compressed combustion air and re-circulated exhaust gases to temperatures equal to or below the dew point of at least one of the combustion air and re-circulated exhaust gases, the intercooler having an inlet, an outlet and a reservoir removed from the inlet and outlet for collecting condensation with a valve for removing collected condensation from the reservoir whereby injection of liquid in the form of water, nitric and sulfuric acids formed by reaction of condensed water with the exhaust gases into the combustion chamber of the engine is avoided.

8. The EGR system of claim 1 further including an EGR cooler in fluid communication with the exhaust gases traveling in the EGR line for cooling the re-circulated exhaust gases prior to introduction to the filtered combustion air at the outlet of the EGR line.

9. The EGR system of claim 8 further including a valve controlling the flow of exhaust gases in the EGR line, the valve being controlled by the engine control unit.

10. The EGR system of claim 1 further including a valve controlling the flow of exhaust gases in the EGR line, the valve being controlled by the engine control unit.

11. An EGR system for a vehicle equipped with a diesel engine having an intake manifold and an exhaust manifold comprising:

a turbocharger having a compressor for supplying combustion air to the intake manifold and a turbine operatively connected to the compressor for receiving exhaust gases from the exhaust manifold to operate the compressor;

an exhaust particulate filter downstream of and in fluid communication with the outlet of the turbine for removing particulate matter from the exhaust gases;

an intake air filter upstream of the compressor for supplying filtered combustion air to the compressor;

a low pressure EGR line extending from an inlet downstream of the turbine to an outlet upstream of the compressor and downstream of the air filter;

an inlet of the EGR line formed as a pick-up tube in fluid communication with an EGR particulate filter positioned upstream of the exhaust particulate filter whereby backpressure developed on the exhaust gases by the exhaust particulate filter in combination with vacuum developed at the EGR line outlet by filtered combustion airflow from the air filter induces a slip stream of the exhaust gases to travel through the EGR line from its inlet to its outlet;

an intercooler downstream of the compressor for cooling compressed combustion air and re-circulated exhaust gases to temperatures equal to or below the dew point of at least one of the combustion air and re-circulated exhaust gases, the intercooler having a reservoir for collecting condensation and a valve for removing collected condensation from the reservoir whereby injection of liquid in the form of water, nitric and sulfuric acids formed by reaction of condensed water with the exhaust gases into the combustion chamber of the engine is avoided; and, a liquid sensor in the reservoir and an electronically actuated valve operable when the reservoir is under positive pressure and in response to set liquid sensor readings to drain the reservoir.

12. An EGR system for a vehicle equipped with a diesel engine having an intake manifold and an exhaust manifold comprising:

a turbocharger having a compressor for supplying combustion air to the intake manifold and a turbine operatively connected to the compressor for receiving exhaust gases from the exhaust manifold to operate the compressor;

an exhaust particulate filter downstream of and in fluid communication with the outlet of the turbine for removing particulate matter from the exhaust gases;

an intake air filter upstream of the compressor for supplying filtered combustion air to the compressor;

a low pressure EGR line extending from an inlet downstream of the turbine to an outlet upstream of the compressor and downstream of the air filter;

an inlet of the EGR line formed as a pick-up tube in fluid communication with an EGR particulate filter positioned upstream of the exhaust particulate filter whereby backpressure developed on the exhaust gases by the exhaust particulate filter in combination with vacuum developed at the EGR line outlet by filtered combustion airflow from the air filter induces a slip stream of the exhaust gases to travel through the EGR line from its inlet to its outlet;

said EGR particulate filter being a gas pervious wall flow filter with the walls thereof coated with a catalyst over which the exhaust gases entering the EGR line pass whereby soluble organic fractions and insoluble fractions of particulate matter drawn into the EGR line are effectively removed from the exhaust gases;

an intercooler downstream of the compressor for cooling compressed combustion air and re-circulated exhaust gases to temperatures equal to or below the dew point of at least one of the combustion air and re-circulated exhaust gases, the intercooler having a reservoir for collecting condensation and a valve for removing collected condensation from the reservoir whereby injection of liquid in the form of water, nitric and sulfuric acids formed by reaction of condensed water with the exhaust gases into the combustion chamber of the engine is avoided; and, a liquid sensor in the reservoir and an electronically actuated valve operable when the reservoir is under positive pressure and in response to set liquid sensor readings to drain the reservoir.

13. An EGR system for a vehicle equipped with a diesel engine having an intake manifold and an exhaust manifold comprising:

a turbocharger having a compressor for supplying combustion air to said intake manifold and a turbine operatively connected to said compressor for receiving exhaust gases from said exhaust manifold to operate said compressor;

an exhaust particulate filter downstream of and in fluid communication with said outlet of said turbine for removing particulate matter from said exhaust gases produced by said engine;

an intake air filter upstream of said compressor for supplying filtered combustion air to said compressor;

a low pressure EGR line extending from an inlet downstream of said turbine to an outlet upstream of said compressor and downstream of said air filter; and an air-to-air intercooler downstream of the compressor for cooling compressed combustion air and re-circulated exhaust gases to temperatures equal to or below the dew point of at least one of the combustion air and re-circulated exhaust gases, said intercooler having an inlet, an outlet and a reservoir for collecting condensation removed from said inlet and outlet with a valve for removing collected condensed water from the reservoir whereby injection of liquid in the form of water, nitric and sulfuric acids formed by reaction of condensed water with the exhaust gases into the combustion chamber of said engine is avoided.

14. The EGR system of claim 13 wherein the inlet of the EGR line being formed as a pick-up tube in fluid communication with an EGR particulate filter positioned upstream of the exhaust particulate filter whereby backpressure developed on the exhaust gases by the exhaust particulate filter in combination with vacuum developed at the EGR line outlet by filtered combustion air flow from the air filter induces a slip stream of the exhaust gases to travel through the EGR line from its inlet to its outlet.

15. The EGR system of claim 14 wherein the EGR particulate filter has a catalyzed surface over which the exhaust gases entering the EGR line pass whereby the exhaust gases traveling through the EGR line are cleansed by the catalyzed surface.

16. The EGR system of claim 13 wherein the EGR line is corrugated, sized, and positioned in the vehicle for ambient air heat transfer contact with at least a portion of the EGR line when the vehicle is moving to reduce temperature of the exhaust gases within the EGR line to a normal level of no more than about 250° C. whereby external cooling of the exhaust gases within the EGR line is obviated.

17. An EGR system for a vehicle equipped with a diesel engine having an intake manifold and an exhaust manifold comprising:

a turbocharger having a compressor for supplying combustion air to the intake manifold and a turbine operatively connected to the compressor for receiving exhaust gases from the exhaust manifold to operate the compressor;

an exhaust particulate filter downstream of and in fluid communication with the outlet of the turbine for removing particulate matter from the exhaust gases;

an intake air filter upstream of the compressor for supplying filtered combustion air to the compressor;

a low pressure EGR line extending from an inlet downstream of the turbine to an outlet upstream of the compressor and downstream of the air filter;

an intercooler downstream of the compressor for cooling compressed combustion air and re-circulated exhaust gases to temperatures equal to or below the dew point of at least one of the combustion air and re-circulated exhaust gases, the intercooler having a reservoir for collecting condensation and a valve for removing collected condensed water from the reservoir whereby injection of liquid in the form of water, nitric and sulfuric acids formed by reaction of condensed water with the exhaust gases into the combustion chamber of the engine is avoided; and, a liquid sensor in the reservoir and an electronically actuated valve operable when the reservoir is under positive pressure and in response to set liquid sensor readings to drain the reservoir.

\* \* \* \* \*